United States Patent
Bedner et al.

(10) Patent No.: US 7,562,353 B2
(45) Date of Patent: Jul. 14, 2009

(54) METHODS AND SYSTEMS FOR TRANSFORMING JAVA APPLICATIONS OF BEHALF OF ANOTHER DEVICE

(75) Inventors: Ilja Bedner, Palo Alto, CA (US); Venkatesh Krishnan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 10/439,740

(22) Filed: May 16, 2003

(65) Prior Publication Data
US 2004/0230950 A1 Nov. 18, 2004

(51) Int. Cl.
G06F 9/45 (2006.01)
G06F 9/44 (2006.01)

(52) U.S. Cl. .................. 717/140; 717/118; 717/151

(58) Field of Classification Search ............. 717/114, 717/116, 118
See application file for complete search history.

(56) References Cited

U.S. PATENT DOCUMENTS

| | | | | |
|---|---|---|---|---|
| 5,842,017 | A * | 11/1998 | Hookway et al. | 717/158 |
| 6,324,685 | B1 * | 11/2001 | Balassanian | 717/118 |
| 6,477,543 | B1 * | 11/2002 | Huang et al. | 707/200 |
| 6,959,307 | B2 * | 10/2005 | Apte | 707/104.1 |
| 6,976,248 | B2 * | 12/2005 | Balassanian | 717/148 |
| 7,133,894 | B2 * | 11/2006 | Banerjee et al. | 709/203 |
| 2002/0131405 | A1 * | 9/2002 | Lin et al. | 370/352 |
| 2002/0184618 | A1 * | 12/2002 | Bala et al. | 717/148 |
| 2003/0056029 | A1 * | 3/2003 | Huang et al. | 709/328 |
| 2004/0015852 | A1 * | 1/2004 | Swetland | 717/118 |

OTHER PUBLICATIONS

"Design Implementation, and Evaluation of a Compilation Server", Lee et al., Dec. 2004, pp. 1-42. Online retrieved at <http://www-plan.cs.colorado.edu/diwan/compilation_server.pdf>.*

"A Framework for Efficient Reuse of Binary Cose in Java", Joisha et al., Dec. 2001, pp. 440-453. Online retrieved at <http://delivery.acm.org/10.1145/380000/377902/p440-joisha.pdf>.*

"When to use a compilation service?", Palm et al., Jun. 2002, pp. 194-203. Online retrieved at <http://delivery.acm.org/10.1145/520000/513862/p194-palm.pdf>.*

* cited by examiner

*Primary Examiner*—Tuan Q Dam
*Assistant Examiner*—Thuy Dao

(57) ABSTRACT

Methods and systems for delivering a Java application to a requestor device are described. A request for the Java application is received at a node between the requestor device and a source of the Java application. A request for the Java application is sent to the source. The Java application is received from the source at the Intermediate node, which transforms the Java application according to attributes of the requester device. The transformed Java application is then sent to the requestor device.

21 Claims, 2 Drawing Sheets

METHODS AND SYSTEMS FOR TRANSFORMING JAVA APPLICATIONS OF BEHALF OF ANOTHER DEVICE

TECHNICAL FIELD

Embodiments of the present invention relate to the delivery of Java applications over a network.

BACKGROUND ART

Computer system components continue to become smaller and less expensive, and as a result portable devices such as cell phones and personal digital assistants have become more powerful. As portable devices grow in capability, so too does the complexity of applications developed for use on such devices.

The Java programming language is a popular tool for writing these applications because it is platform-independent, an advantage considering the many different types of portable devices that are in use. However, platform-independent Java applications can be relatively large. Although current generation portable devices are more powerful than their predecessors, they still have their limitations. Hence, a platform-independent Java application can be relatively slow to run.

One way to make a platform-independent Java application smaller in size and quicker to run is to modify it into a version that is somewhat, if not entirely, device-specific. For example, a Java application can be made to run more efficiently on a particular brand of portable device by stripping out parts of the application not used by that brand of device.

There are technologies available to help developers of Java applications take a platform-independent application and make it more specific to a particular target device. However, the applications produced by these technologies are no longer platform-independent. Developers have to apply these technologies over and over to produce many different versions of the Java application in order to accommodate the wide variety of possible targets. In essence, the advantage of platform-independence is negated. Instead, application developers are faced with the burden of creating, providing and maintaining many different device-specific Java applications.

Consider the effort associated with updating a particular Java application, perhaps to incorporate a new feature or to correct a flaw. The developer has to either update many different device-specific versions, or generate anew many different device-specific versions once the platform-independent version has been updated.

In addition, new devices are continually being designed and brought to market. Again, the application developer is faced with the task of creating and maintaining another device-specific version each time a new type of device is introduced.

Therefore, a method and/or system that can facilitate the marriage of platform-independent Java applications and the variety of devices that implement such applications would be of value. A method and/or system that can accomplish this without overly burdening application developers or taxing the resources of portable devices would also be valuable. Embodiments of the present invention provide these advantages.

DISCLOSURE OF THE INVENTION

Embodiments of the present invention pertain to methods and systems for delivering a Java application to a requester device are described. A request for the Java application is received at a node between the requestor device and a source of the Java application. A request for the Java application is sent to the source. The Java application is received from the source at the intermediate node, which transforms the Java application according to attributes of the requestor device. The transformed Java application is then sent to the requester device.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
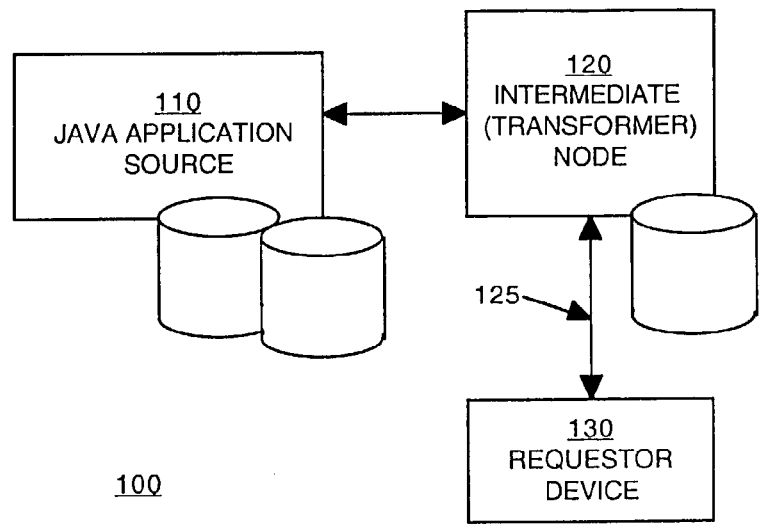
FIG. 1 illustrates a system for delivering Java applications according to embodiments of the present invention.

FIG. 1 illustrates a network or system 100 for delivering content according to one embodiment of the present invention. It is appreciated that system 100 can include elements other than those shown. System 100 can also include more than one of the various elements shown. Furthermore, the functionality provided by multiple elements can be integrated within a single element. For example, the functionality provided by the intermediate node 120 can be incorporated into Java application source 110 (or vice versa).

It is also appreciated that the elements illustrated in FIG. 1 can implement functionality other than that discussed. For example, Java application source 110 can serve as a source of other types of information and applications besides Java applications.

The functionality of each of these elements is described by way of example in conjunction with FIG. 3 below.

Referring first to FIG. 1, the various elements of system 100 are in communication with each other as illustrated. That is, in the present embodiment, Java application source 110 communicates with an intermediate node 120. In one embodiment, Java application source 110 and intermediate node 120 are separate network devices. Alternatively, as mentioned above, Java application source 110 and intermediate node 120 can reside on the same device.

In one embodiment, intermediate node 120 is some type of proxy device, server (e.g., a Wireless Access Protocol server), gateway or the like. Requestor device 130 can be a computer system (such as a laptop, desktop or notebook), a hand-held device (such as a personal digital assistant), a cell phone, a set top box, a watch, or another type of device that, in general, provides the capability for users to execute a Java application. As mentioned above, there actually may be many requester devices with access to intermediate node 120. Such devices can also be referred to as client devices. In a heterogeneous network, each of these requestor devices can have different attributes or profiles. These attributes include, but are not, limited to, the display, power, communication and computational capabilities and characteristics of the various requester devices.

Communication can occur directly between elements, or indirectly through intermediary devices or nodes that are not shown. Also, communication can be wired or wireless, or a combination of wired and wireless. This communication can occur over the World Wide Web (or Internet), over an Intranet, over a service provider network, or by other means.

There can actually be many communication channels downstream of the intermediate node 120. In a heterogeneous network, each of these communication channels (exemplified by communication channel 125) can have different attributes. For example, one channel may be characterized as having a higher bandwidth (higher data transfer rate) than another channel.

Figure 2:
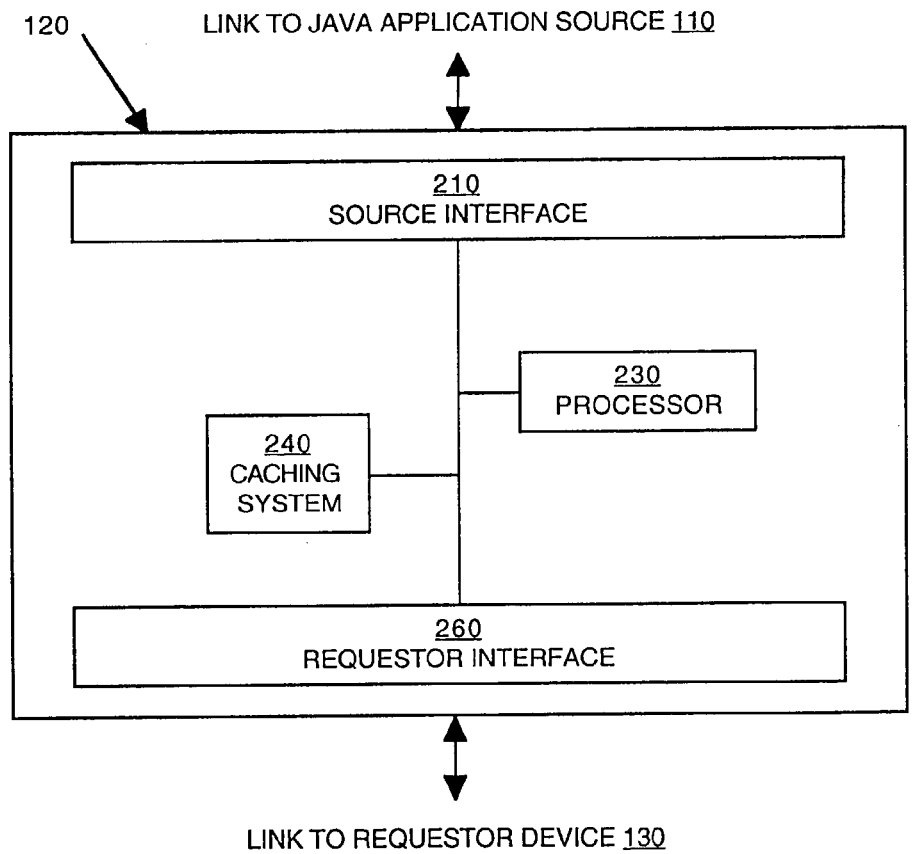
FIG. 2 is a block diagram illustrating the functional elements provided by a node that transforms Java applications according to embodiments of the present invention.

FIG. 2 is a block diagram showing the functional elements provided by an intermediate node 120 in accordance with one embodiment of the present invention. In the present embodiment, intermediate node 120 includes a source interface 210 for communicating with the Java application source 110; a processor 230 for processing information and instructions; a caching system 240 for storing information; and a requester interface 260 for communicating with the requestor device 130. These elements are rendered separately for clarity of illustration and discussion; however, it is understood that these elements may not exist as separate entities within intermediate node 120. For example, source interface 210 and requestor interface 260 can be embodied as a single unit that functions as both a receiver and a transmitter. In general, according to the various embodiments of the present invention, intermediate node 120 provides the capability and functionality provided by the various elements of FIG. 2. In addition, intermediate node 120 may provide capabilities and functionalities in addition to those described herein.

Figure 3:
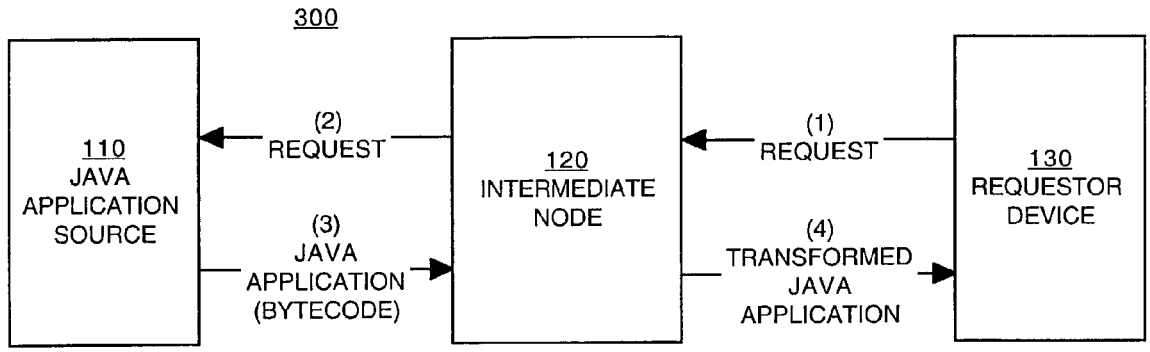
FIG. 3 is a data flow diagram of a method for delivering Java applications according to one embodiment of the present invention.

FIG. 3 is a data flow diagram 300 of a method for delivering Java applications according to one embodiment of the present invention. In this embodiment, requestor device 130 transmits a request for a particular Java application of interest (1). The request is received by intermediate node 120, which forwards the request to Java application source 110 (2). Alternatively, intermediate node 120 can form its own request based on the request received from requestor device 130.

By way of background, Java source code is compiled into a format that can be referred to as bytecode. The compiled Java code is run on a device using an interpreter commonly referred to as a Java Virtual Machine (JVM). The Java Archive (JAR) file format is useful for bundling multiple files into a single archive file. Typically, a JAR file will contain the class files and auxiliary resources associated with Java applets and applications.

In the present embodiment, Java application source 110 is a source of Java applications including applets and libraries, in the form of bytecode and perhaps embodied as JAR files. In particular, the Java applications at Java application source 110 can be platform-independent. That is, each application can be written so that it will run on different types of requester or client devices (exemplified by requestor device 130). Thus, according to the embodiments of the present invention, the writer (or developer or vendor) of the Java application does not need to produce a different version for each of the various types of requester devices, nor does the writer/developer/vendor have to modify a platform-independent Java application according to the requirements or attributes of the different types of requester devices. Developer of Java applications can instead produce and maintain a platform-independent version of each application.

In one embodiment, in response to the request from intermediate node 120, Java application source 110 sends information for the application of interest to intermediate node 120 (3). Alternatively, there can be instances in which intermediate node 120 prefetches the application information from Java application source 110.

The information received from Java application source 110 can include the bytecode application for the application in entirety, one or more applets, or one or more libraries. What is of significance is that the information received from Java application source 110 is platform-independent.

According to the various embodiments of the present invention, intermediate node 120 transforms the platform-independent Java application information received from application source 110 into information specific to the type of requester device (exemplified by requestor device 130). Intermediate node 120 can execute a JVM to interpret the application of interest. The bytecode can be condensed (reduced in size) using techniques known in the art. The bytecode can be converted from its platform-independent format into a format that is specific to the device that is requesting the Java application (e.g., specific to requestor device 130). Techniques for accomplishing this are known in the art. Bytecode can also be converted into machine (assembly) language or into native language using a just-in-time (JIT) or ahead-of-time compiler known in the art.

Thus, a platform-independent Java application is transformed when requested. If a particular type of device does not request the application, then it is not necessary to transform the application. As new types of devices are introduced, versions for these new devices are produced if and when a new type of device requests the application. The transformation of the platform-independent version is performed by intermediate node 120, reducing the burden on application developers. In addition, the amount of effort is reduced overall because, in general, each device-specific version is produced only when requested. In other words, many different device-specific versions do not need to be produced anticipating their need; instead, a device-specific version is produced when the need is realized.

Also of significance, intermediate node 120 is a trusted device from the perspective of requestor device 130. That is, there is a trusted relationship between intermediate node 120 and requestor device 130. For example, consider a scenario in which requester device 130 is a cell phone and intermediate node 120 is a Wireless Access Protocol (WAP) server. The cell phone service provider ensures that a trusted relationship exists between the cell phone and the WAP server.

A trusted relationship can also exist between Java application source 110 and intermediate node 120, although this may not be the case. As mentioned above, intermediate node 120 can execute a JVM for the different Java applications received from Java application source 110. The code produced by the JVM is safe for use on requestor device 130. Thus, if malicious code was received from Java application source 110, the JVM executed by intermediate node 120 would prevent the malicious code from reaching requestor device 130.

Once the Java application is transformed, intermediate node 120 sends the transformed Java application to requester device 130 (4). In one embodiment, the transformed Java application is cached at intermediate node 120. If another request for the Java application is received from a requestor device that is the same or substantially the same as requester device 130, the cached (and transformed) Java application can be sent in lieu of retrieving and transforming the platform-independent version.

The requester device 130 can then execute the transformed version of the Java application. In essence, according to the various embodiments of the present invention, all or a portion of the Java technology is implemented at the intermediate node 120 instead of at requestor device 130. Thus, according to the embodiments of the present invention, the use of the Java bytecode on the requestor device is obviated because the Java application is compiled beforehand. In addition, it is not necessary for a JVM to be present on the requestor device, at least for those Java applications received from Java application source 110 via intermediate node 120.

Because the transformed version is specific to requestor device 130, and because the application does not have to run using a JVM on requestor device 130, the application can run more efficiently and more quickly on the requestor device. In other words, some of the processing work has been performed by intermediate node 120, leaving less processing to requester device 130. Moreover, by virtue of its reduced (e.g., condensed) size, the application can be transferred more quickly over communication channel 125, and downloaded more quickly by requestor device 130. In sum, less of the resources available on requester device 130 are consumed, and the resources that are used are used more efficiently.

According to other embodiments of the present invention, additional services or functions can be performed by intermediate node 120. In one embodiment, intermediate node 120 utilizes a Java verification program to verify the Java application.

In another embodiment, intermediate node 120 can be used to supplement the memory capacity of requestor device 130. Because intermediate node 120 is a trusted node, information that would otherwise be stored on requestor device 130 can instead be stored at intermediate node 120. A memory management scheme can be implemented on requestor, device 130 so that the device knows where the information is stored. The information can later be accessed or retrieved regardless of the actual physical location of the requestor device 130. When information is to be retrieved from intermediate node 120, requestor device 130 can identify its location to intermediate node 120. In some implementations—for instance, when requester device 130 is a cell phone—the location of requester device 130 can automatically be made known to intermediate node 120.

Figure 4:
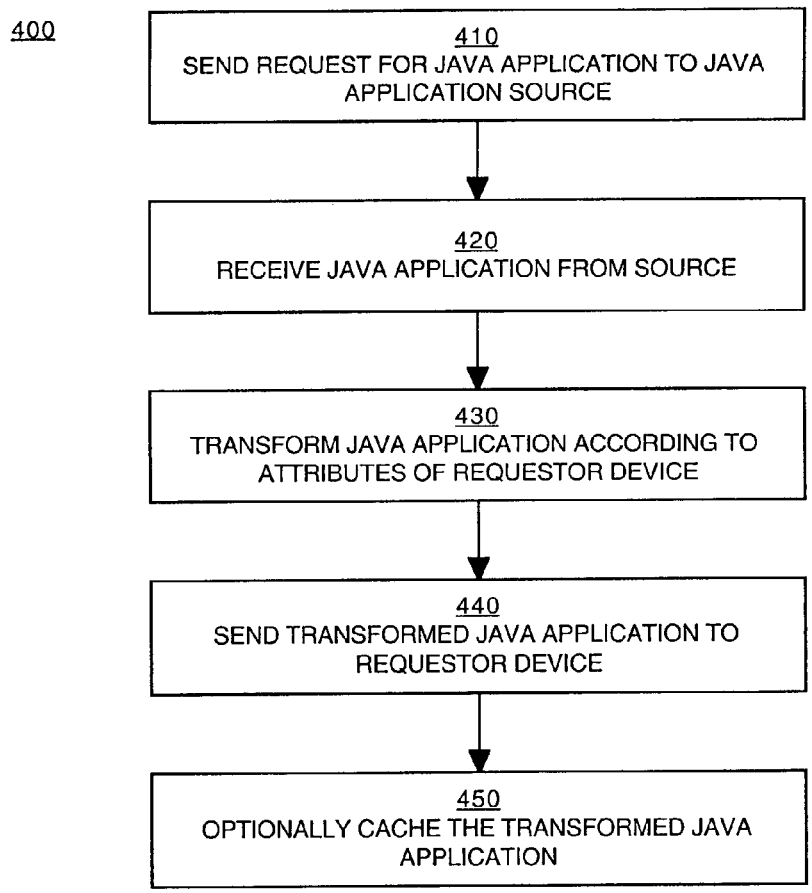
FIG. 4 is a flowchart of a method for delivering Java applications according to one embodiment of the present invention.

FIG. 4 is a flowchart 400 of a method for delivering Java applications according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the methods described by flowchart 400 may be implemented using computer-readable and computer-executable instructions which reside, for example, in computer-usable media of a computer system or like device. Generally, flowchart 400 is implemented by devices such as intermediate node 120 of FIGS. 1, 2 and 3.

In step 410 of FIG. 4, in the present embodiment, a request identifying a Java application is sent from a requestor (e.g., client) device to the intermediate node. In turn, the intermediate node forwards the request (or a request based on the initial request) to a source of the Java application.

In step 420, information for the Java application is received from the source. The information can include, for example, the bytecode for the application, a JAR file, one or more applets, or one or more libraries.

In step 430, the information for the Java application is transformed according to attributes of the requester device. Techniques for recognizing the type of requester device and its attributes are known in the art. These attributes can include, for example, the display, power, communication and computational capabilities and characteristics of the requestor device. The transforming can include, for instance, compiling the information for the Java application into native instructions for the requestor device using an ahead-of-time Java compiler, or condensing the information for the Java application to reduce it in size. Optionally, the information for the Java application can be verified using a Java verification program.

The information for the Java application can also be transformed according to the attributes of the communication channel to the requestor device (e.g., communication channel 125 of FIG. 1). For example, the Java application can be reduced in size for a lower bandwidth connection. Techniques for recognizing the type of connection and its bandwidth are known in the art.

In step 440, the transformed information for the Java application is sent to the requestor device.

In step 450, in one embodiment, the transformed information for the Java application is cached at intermediate node 120 (FIG. 1).

In summary, embodiments of the present invention provide methods and systems for delivering a Java application to a requestor device. These methods and systems facilitate the marriage of platform-independent Java applications and the variety of devices that implement such applications. These methods and systems accomplish this without overly burdening application developers or taxing the resources of portable devices.

Embodiments of the present invention are thus described. While the present invention has been described in particular embodiments, it should be appreciated that the present invention should not be construed as limited by such embodiments, but rather construed according to the following claims.

What is claimed is:

1. In a network device, a method of delivering an application to a requestor device, said method comprising:

sending a request identifying said application to a source of said application;

receiving information for a platform-independent version of said application from said source;

transforming said information for said platform-independent version of said application according to at least one attribute of a communication channel to said requestor device;

sending transformed information comprising a platform-dependent version of said application to said requestor device; and storing information specific to said requestor device comprising said transformed information, wherein said information specific to said requestor device instead is stored on said network device, to said requestor subsequent to said sending of said transformed information.

2. The method of claim 1 wherein said information far said platform-independent version of said application received from said sauna is compiled into bytecode.

3. The method of claim 1 wherein said transforming comprises:
compiling said information for said platform independent version of said application into native instructions for said requestor device using an ahead-of-time compiler.

4. The method of claim 1 wherein said transforming comprises:
condensing said information for said platform dependent version of said application to reduce it in size.

5. The method of claim 1 further comprising:
verifying said information for said platform-independent version of said application using a verification program.

6. The method of claim 1 further comprising:
caching said transformed information for said platform-dependent version of said application.

7. The method of claim 1, wherein said at least one attribute comprises a bandwidth of the communication channel.

8. A computer system comprising:
a communication link to an application source and a communication link to a client device;
a memory unit coupled to said communication links; and
a processor coupled to said memory unit, said processor for executing a method for delivering an application, said method comprising:
receiving a request for said application from said client device;
sending a request for a platform-independent version of said application to said application source;
receiving said platform-independent version of said application from said application source;
creating a transformed application from said platform-independent version of said application, wherein said creation of the transformed application transforms said platform-independent version of said application according to at least one attribute of a communication channel to said client device transformed;
sending said transformed application to said client device; and
storing information specific to said client device comprising said transformed application, wherein said information specific to said client device is stored on said computer system information is subsequent to said sending or said transformed application.

9. The computer system of claim 8 wherein said platform-independent version of said application received from said source is compiled into bytecode.

10. The computer system of claim 8 wherein said creating comprises:
compiling said platform-independent version of said application into native instructions for said client device using an ahead-of-time compiler.

11. The computer system of claim 8 wherein said creating comprises:
condensing said transformed application to reduce it in size.

12. The computer system of claim 8 wherein said method further comprises:
verifying said platform-independent version of said application using a verification program.

13. The computer system of claim 8 wherein said method further comprises:
storing said transformed application; and
sending a stored transformed application to another client device that has said attributes in response to a request from said other client device for said application.

14. The computer system of claim 8 wherein said at least one attribute comprises a bandwidth of the communication channel.

15. A computer-usable medium storing computer-readable program code embodied therein for causing a computer system to perform a method for delivering an application from a source to a receiver, said method comprising:
instructing said source to deliver to said computer system a platform-independent version of said application;
transforming said platform-independent version of application at said computer system to create a transformed version, wherein said transformation is performed according to at least one attribute of a communication channel to said receiver;
sending said transformed version to said receiver; and
placing information specific to said receiver and provided by said receiver into memory, wherein said information specific to said receiver is stored subsequent to said sending of said transformed version.

16. The computer-usable medium of claim 15 wherein said platform-independent version of said application received from said source is compiled into bytecode.

17. The computer-usable medium of claim 15 wherein said computer-readable program code embodied therein causes a caching proxy to perform said method wherein said transforming comprises:
compiling said platform-independent version of said application into native instructions for said receiver using an ahead-of-time compiler.

18. The computer-usable medium of claim 15 wherein said computer-readable program code embodied therein causes a caching proxy to perform said method wherein said transforming comprises:
condensing said transformed application to reduce it in size.

19. The computer-usable medium of claim 15 wherein said computer-readable program code embodied therein causes a caching proxy to perform said method further comprising:
using a verification program to verify said transformed application.

20. The computer-usable medium of claim 15 wherein said computer-readable program code embodied therein causes a caching proxy to perform said method further comprising:
placing said transformed application into memory.

21. The computer-usable medium of claim 15 wherein said at least one attribute comprises a bandwidth of the communication channel.

* * * * *

UNITED STATES PATENT AND TRADEMARK OFFICE
CERTIFICATE OF CORRECTION

PATENT NO. : 7,562,353 B2  Page 1 of 1
APPLICATION NO. : 10/439740
DATED : July 14, 2009
INVENTOR(S) : Ilja Bedner et al.

It is certified that error appears in the above-identified patent and that said Letters Patent is hereby corrected as shown below:

On the Title page, in Item (54), in "Title", in column 1, line 2, delete "OF" and insert -- ON --, therefor.

In column 1, line 2, delete "OF" and insert -- ON --, therefor.

In column 7, line 4, in Claim 1, after "device" delete ", to said requestor".

In column 7, line 6, in Claim 2, delete "far" and insert -- for --, therefor.

In column 7, line 8, in Claim 2, delete "sauna" and insert -- source --, therefor.

In column 7, line 11, in Claim 3, delete "platform independent" and insert -- platform-independent --, therefor.

In column 7, line 16, in Claim 4, delete "platform dependent" and insert -- platform-dependent --, therefor.

In column 7, line 44, in Claim 8, after "device" delete "transformed".

In column 7, line 50, in Claim 8, after "system" delete "information is".

In column 8, line 24, in Claim 15, after "transformation" insert -- version --.

Signed and Sealed this

Seventeenth Day of November, 2009

David J. Kappos
*Director of the United States Patent and Trademark Office*